United States Patent
Horng

(10) Patent No.: US 8,695,623 B2
(45) Date of Patent: Apr. 15, 2014

(54) GAS CONCENTRATION CONTROL DEVICE FOR PRESSURE VESSEL

(75) Inventor: Horng Chih Horng, Hsinchu (TW)

(73) Assignee: Ableprint Technology Co., Ltd., Hsinchu (TW)

( * ) Notice: Subject to any disclaimer, the term of this patent is extended or adjusted under 35 U.S.C. 154(b) by 56 days.

(21) Appl. No.: 13/449,479

(22) Filed: Apr. 18, 2012

(65) Prior Publication Data

US 2013/0037126 A1 Feb. 14, 2013

(30) Foreign Application Priority Data

Aug. 10, 2011 (TW) .............................. 100214832 U

(51) Int. Cl.
G05D 11/00 (2006.01)

(52) U.S. Cl.
USPC ............................................ 137/93; 137/102

(58) Field of Classification Search
USPC ............................................. 137/88, 93, 102
See application file for complete search history.

(56) References Cited

U.S. PATENT DOCUMENTS

| | | | | |
|---|---|---|---|---|
| 3,516,429 A | * | 6/1970 | Sandstede et al. | 137/87.04 |
| 4,206,753 A | * | 6/1980 | Fife | 128/201.21 |
| 4,253,480 A | * | 3/1981 | Kessel et al. | 137/102 |
| 4,394,871 A | * | 7/1983 | Czajka et al. | 137/115.25 |
| 4,474,476 A | * | 10/1984 | Thomsen | 366/152.4 |
| 5,020,564 A | * | 6/1991 | Thoman et al. | 137/102 |
| 5,257,640 A | * | 11/1993 | Delajoud | 137/14 |
| 5,615,832 A | * | 4/1997 | Price | 239/8 |
| 6,003,543 A | * | 12/1999 | Sulatisky et al. | 137/487.5 |
| 6,830,774 B2 | * | 12/2004 | Hayashi et al. | 427/8 |
| 2001/0032668 A1 | * | 10/2001 | Doty et al. | 137/93 |
| 2007/0254093 A1 | * | 11/2007 | Nijhawan et al. | 427/8 |
| 2008/0183340 A1 | * | 7/2008 | Kofuji et al. | 700/301 |
| 2010/0108154 A1 | * | 5/2010 | Minami et al. | 137/88 |

* cited by examiner

*Primary Examiner* — Stephen M Hepperle
*Assistant Examiner* — R. K. Arundale
(74) *Attorney, Agent, or Firm* — Rosenberg, Klein & Lee

(57) ABSTRACT

A gas concentration control device for pressure vessel is provided for controlling gas concentration inside an accommodation space that is set in an interior of a chamber formed inside a pressure vessel curing oven. The pressure vessel curing oven includes a gas inlet tube with a first valve and a gas outlet tube with a second valve, which are in communication with the accommodation space. The gas concentration control device includes a gas concentration detection device, which is operative for timed detection of concentration of a gas inside the accommodation space, and a control unit for setting a predetermined concentration, performing a judgment if the gas concentration inside the accommodation space reaches the predetermined concentration according to a detection result of the gas concentration detection device, and thereby controls the first valve and the second valve according to result of the judgment.

13 Claims, 3 Drawing Sheets

GAS CONCENTRATION CONTROL DEVICE FOR PRESSURE VESSEL

BACKGROUND OF THE INVENTION

1. Field of the Invention

The present invention relates to a gas concentration control device, and in particular to a gas concentration control device that is used in a pressure vessel curing oven to control gas concentration inside an accommodation space thereof.

2. The Related Arts

In prior art, a de-voiding curing oven applies high pressure and high temperature to an adhesive material. The high temperature lowers the viscosity of the adhesive material and the high pressure removes voids that are existing in the adhesive material out of the adhesive material by means of pressure difference, or shrinks the voids contained in the adhesive material by means of the pressure difference, so as to effectively improve product quality and reliability. Such a prior art technique has been widely applied to semiconductor packaging processes, and currently, an industrial pressure vessel curing oven commonly used to process adhesive materials for bonding chips. The pressure vessel curing oven has an interior chamber that is connected a high pressure gas outside the curing oven to serve as a gas source. An electrical heating device is used to supply thermal energy that is required inside the curing oven. A driving motor is external to the curing oven and a fan arranged in a center of the electrical heating device is driven by the driving motor to rotate. The fan comprises an agitation device to cause the heated high temperature high pressure gas inside the curing oven to flow and thus spread uniformly, so that a semiconductor material placed in the curing oven can be uniformly heated.

The concentration of the gas inside the curing oven is difference for processes of different products. However, the conventional measurement and control device are generally of poor pressure endurability and are not useable in the high temperature and high pressure environment inside the curing oven. Improvement is desired in this respect.

SUMMARY OF THE INVENTION

A primary objective of the present invention is to provide a gas concentration control device for pressure vessel, which is applicable in a high temperature and high pressure environment, such as an accommodation space inside a pressure vessel curing oven that is used in semiconductor packaging processing, in order to carry out control of concentration of gas inside the space.

The solution adopted in the present invention to overcome the problems of the prior techniques comprises a gas concentration control device for pressure vessel for controlling gas concentration inside an accommodation space that is set in an interior of a chamber formed inside a curing oven. The curing oven comprises a gas inlet tube and a gas outlet tube, which are in communication with the accommodation space for inflow and outflow of gas. The gas inlet tube is connected to a gas source, and the gas inlet tube is provided with a first valve. The gas outlet tube is provided with a second valve. The gas concentration control device comprises a gas concentration detection device, which is operative for timed detection of concentration of a gas inside the accommodation space, and a control unit, which is connected to the gas concentration detection device, the first valve, and the second valve and is provided for setting a predetermined concentration, judging if the gas concentration inside the accommodation space reaches the predetermined concentration according to a detection result of the gas concentration detection device, and performing controls over the first valve and the second valve according to result of the judgment.

When the result of the judgment of the control unit is that the predetermined concentration is not reached, the first valve is opened to allow gas to flow from the gas source into the accommodation space. The control unit opens the second valve at the time when opening the first valve. When the result of the judgment of the control unit is that the predetermined concentration is reached, the first valve is closed.

In a preferred embodiment of the present invention, the control unit closes the second valve at the time when closing the first valve.

In another preferred embodiment of the present invention, the accommodation space comprises at least one pressure sensor that is arranged therein to detect pressure therein. The control unit is operative for setting a predetermined pressure, judging if the pressures inside the accommodation space reaches the predetermined pressure according to a result of detection of the at least one pressure sensor. When result of the judgment of the control unit is that the predetermined concentration is reached but the predetermined pressure is not reached, the control unit closing the second valve; and when the result of the judgment is that the predetermined concentration is reached and the predetermined pressure is reached, the control unit closing the first valve.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
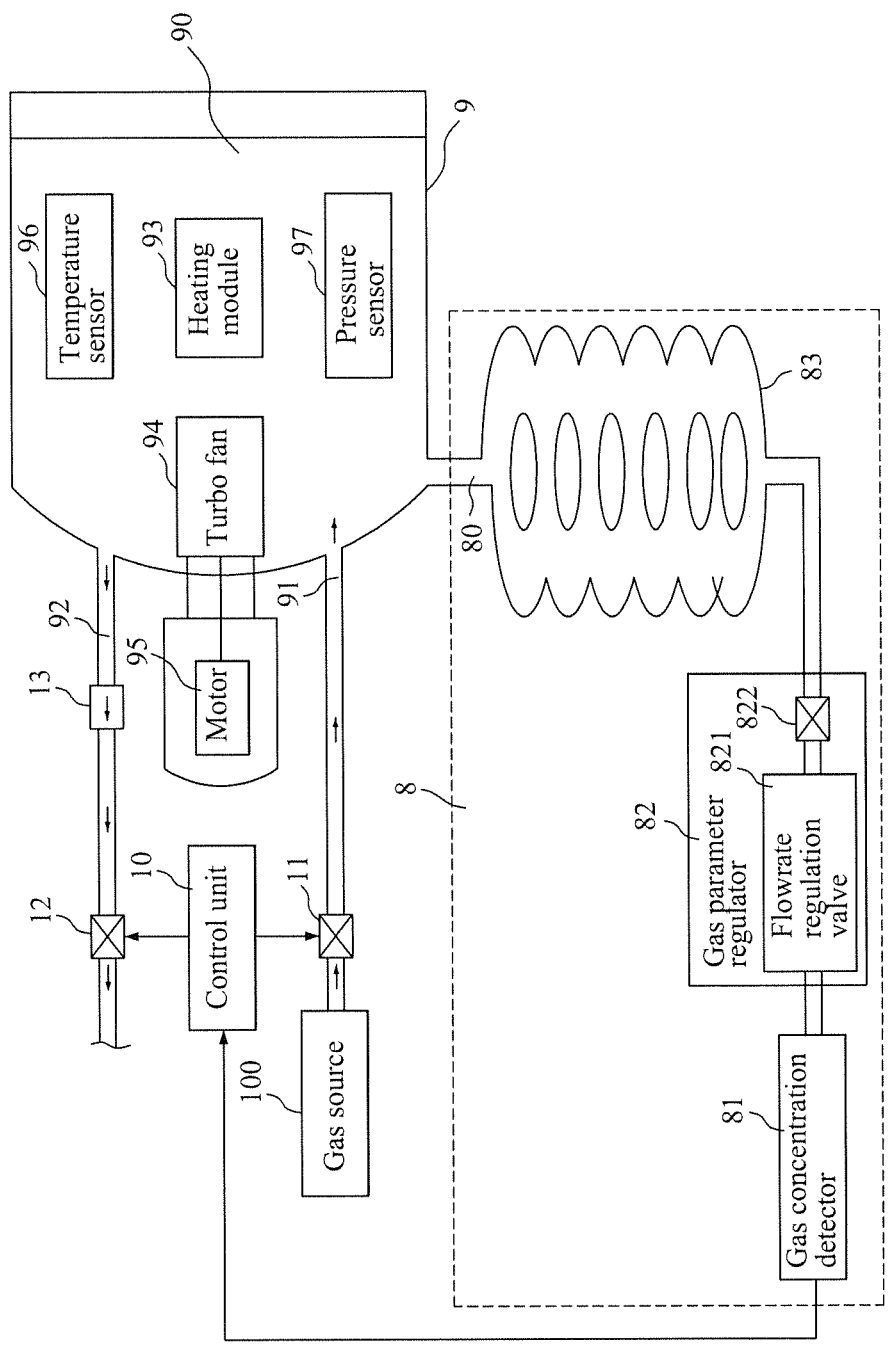
FIG. 1 is a functional block diagram according to a preferred embodiment of the present invention.

With reference to the drawings and in particular to FIG. 1, which is a schematic view showing a functional block diagram according to a preferred embodiment of the present invention, as shown in the drawing, the present invention provides a gas concentration control device for pressure vessel, which is used to control gas concentration inside an accommodation space 90 that is set in an interior of a chamber formed inside a curing oven 9.

The curing oven 9 comprises a gas inlet tube 91 and a gas outlet tube 92, which are both in communication with the accommodation space 90 for inflow and outflow of gas. The gas inlet tube 91 is connected to a gas source 100. The gas inlet tube 91 is provided with a first valve 11, which is used to control inflow of gas into the accommodation space 90. The gas outlet tube 92 is provided with a second valve 12 and a valve 13. The second valve 12 functions to control outflow of gas from the accommodation space 90. The valve 13 is preferably a one-way valve or a check valve for constraining gas flow in a backward direction into the accommodation space 90.

In an embodiment of the present invention, the pressure inside the accommodation space 90 of the curing oven 9 is greater than 2 atm. Arranged inside the chamber of the curing oven 9 is at least one heating module 93 to make the accommodation space 90 reaching a predetermined temperature and a predetermined temperature rising rate. The accommodation space 90 comprises a turbo fan 94, at least one temperature sensor 96, and at least one pressure sensor 97 that are arranged therein. The turbo fan 94 is driven by a motor 95 coupled thereto to rotate in order to cause gas contained in the accommodation space 90 to flow. The temperature sensor 96 and the pressure sensor 97 respectively detect the temperature and the pressure inside the accommodation space 90.

The gas concentration control device comprises a gas concentration detection device 8 and a control unit 10. The gas concentration detection device 8 is operative for timed detection of concentration of a gas inside the accommodation space 90. The control unit 10 is connected to the gas concentration detection device 8, the first valve 11, and the second valve 12 to allow a user to set a predetermined concentration level so that a determination can be made if the gas concentration inside the accommodation space 90 reaches the predetermined concentration set by the user according to the detection made by the gas concentration detection device 8 to judge and to control the first valve 11 and the second valve 12 according to the determination.

The gas concentration detection device 8 is connected by a connection tube 80 to the accommodation space 90 and comprises a gas concentration detector 81, a gas parameter regulator 82, and an extension connection tube 83. The extension connection tube 83 is connected to the connection tube 80 and the gas parameter regulator 82 is connected between the gas concentration detector 81 and the extension connection tube 83.

The gas parameter regulator 82 performs regulation of the gas flowing therein through the extension connection tube 83 in order to make specific parameters of the inflowing gas, such as temperature, pressure, and flow velocity, matching a measurement range of the gas concentration detector 81 for performance of measurement thereby. The gas parameter regulator 82 comprises a flowrate regulation valve 821 and a third valve 822, of which the flowrate regulation valve 821 regulates the flowrate and flow velocity of the gas supplied to the gas concentration detector 81 and the third valve 822 is controlled by a controller (not shown) to control if the gas to be detected that is contained in the accommodation space 90 is allowed to flow into the gas concentration detector 81. The gas concentration detector 81 functions to detect gas concentration. The extension connection tube 83 is preferably a coil tube and the gas to be detected that flows from the accommodation space 90 can be cooled when flowing through the extension connection tube 83.

Figure 2:
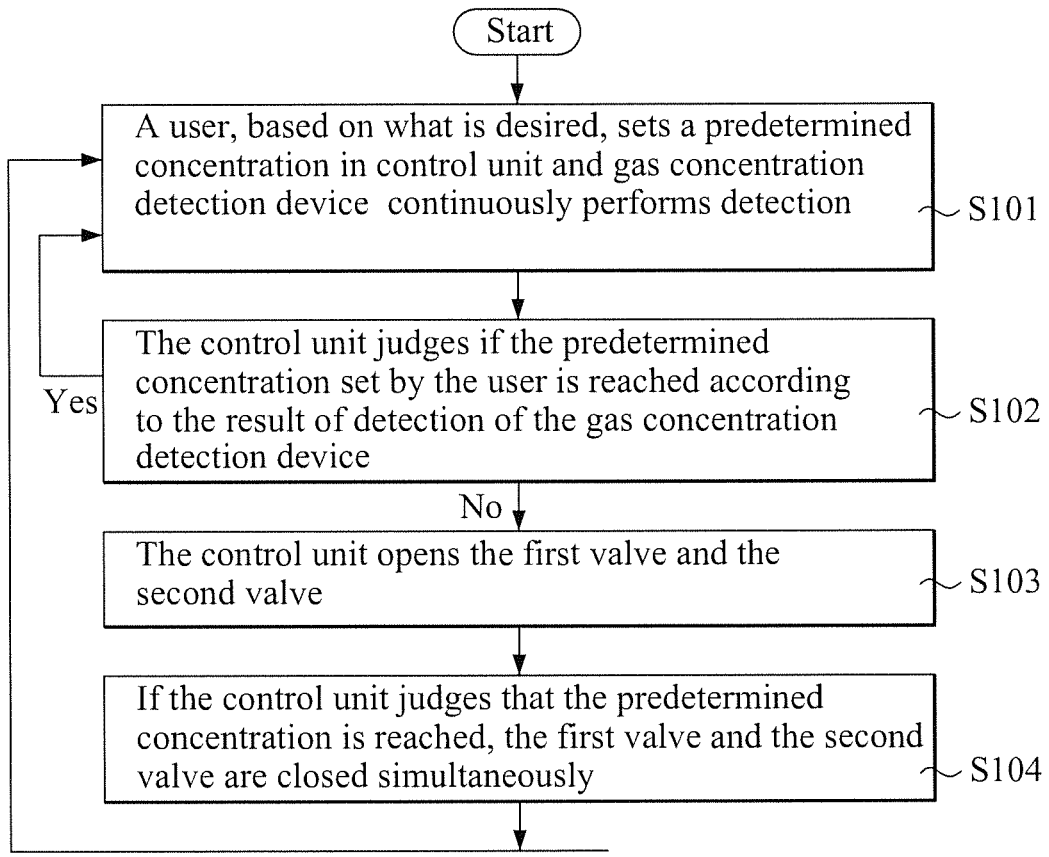
FIG. 2 is a control flow chart according to a preferred embodiment of the present invention.

Referring to FIG. 2, which is a control flow chart according to a preferred embodiment of the present invention, a user, based on what is desired, sets a predetermined concentration in the control unit 10 and the gas concentration detection device 8 continuously performs detection (Step S101); the control unit 10 judges if the predetermined concentration set by the user is reached according to the result of detection of the gas concentration detection device 8 (Step S102); if positive, then the flow returns to Step S101; and if negative, the control unit 10 opens the first valve 11 and the second valve 12 (Step S103), so that gas is allowed to flow from the gas source 100 through the gas inlet tube 91 into the accommodation space 90 and flows out through the gas outlet tube 92; and the control unit 10, and then if the control unit 10 judges that the predetermined concentration is reached, the first valve 11 and the second valve 12 are closed simultaneously (Step S104) to maintain the accommodation space at the predetermined concentration, while the gas concentration detection device 8 continues to perform detection.

Figure 3:
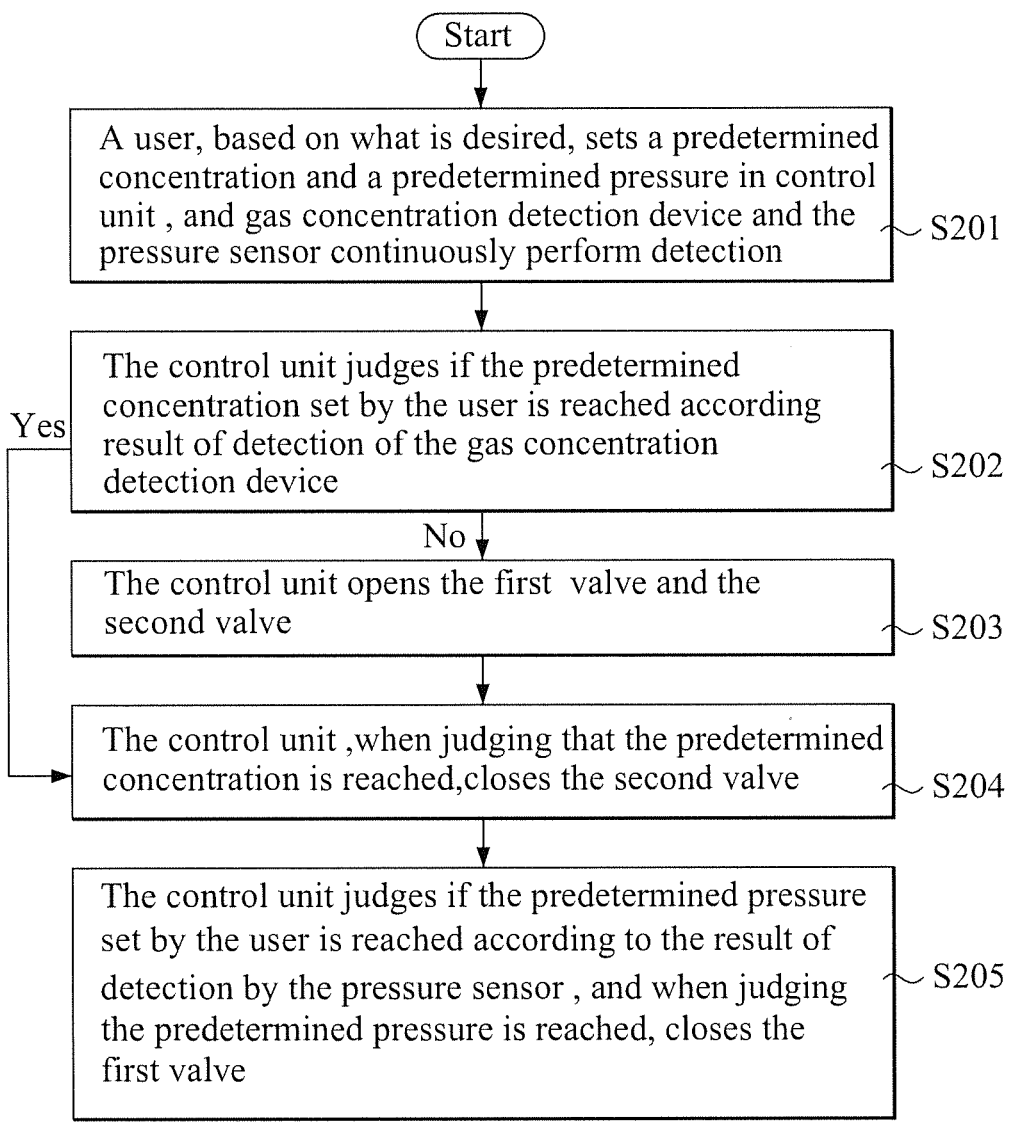
FIG. 3 is a control flow chart according to another preferred embodiment of the present invention.

Referring to FIG. 3, which is a control flow chart according to another preferred embodiment of the present invention, a user, based on what is desired, sets a predetermined concentration and a predetermined pressure in the control unit 10, and the gas concentration detection device 8 and the pressure sensor 97 continuously perform detection (Step S201); the control unit 10 judges if the predetermined concentration set by the user is reached according to the result of detection of the gas concentration detection device 8 (Step S202); if negative, the control unit 10 opens the first valve 11 and the second valve 12 (Step S203), so that gas is allowed to flow from the gas source 100 through the gas inlet tube 91 into the accommodation space 90 and flows out through the gas outlet tube 92; the control unit 10, when judging that the predetermined concentration is reached, closes the second valve 12 (Step S204); and then, the control unit 10 judges if the predetermined pressure set by the user is reached according to the result of detection by the pressure sensor 97, and, when judging the predetermined pressure is reached, closes the first valve 11 (Step S205).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A gas concentration control device for pressure vessel, which is adapted to control a gas concentration inside an accommodation space that is set in an interior of a chamber formed inside a pressure vessel curing oven, the pressure vessel curing oven comprising a gas inlet tube and a gas outlet tube, which are in communication with the accommodation space for inflow and outflow of gas, the gas inlet tube being connected to a gas source, the gas inlet tube being provided with a first valve, the gas outlet tube being provided with a second valve, the gas concentration control device comprising:

a gas concentration detection device, which is operative for timed detection of a concentration of the gas inside the accommodation space; and a control unit, which is connected to the gas concentration detection device, the first valve, and the second valve and is provided for setting a predetermined concentration, performing a judgment if the gas concentration inside the accommodation space reaches the predetermined concentration according to a detection of the gas concentration detection device, and thereby controls the first valve and the second valve according to a result of the judgment;

wherein the gas concentration detection device is connected by a connection tube to the accommodation space and comprises a gas concentration detector and a gas parameter regulator, the gas concentration detector detecting concentration of a gas, the gas parameter regulator being connected between the connection tube and the gas concentration detector to regulate the gas flowing therein through the connection tube in order to make one or more parameters of the gas matching a measurement range of the gas concentration detector for performance of detection by the gas concentration detector.

2. The gas concentration control device as claimed in claim 1, wherein when the result of the judgment of the control unit is not reaching the predetermined concentration, the first valve is opened to allow the gas to flow from the gas source into the accommodation space.

3. The gas concentration control device as claimed in claim 1, wherein when the result of the judgment of the control unit is reached the predetermined concentration, the first valve is closed.

4. The gas concentration control device for pressure vessel as claimed in claim 1, wherein the control unit opens the second valve at the time when opening the first valve.

5. The gas concentration control device for pressure vessel as claimed in claim 1, wherein the control unit closes the second valve at the time when closing the first valve.

6. The gas concentration control device for pressure vessel as claimed in claim 1, wherein the accommodation space comprises at least one pressure sensor that is arranged therein to detect pressure therein, the control unit being operative for setting a predetermined pressure, judging if the pressures inside the accommodation space reaches the predetermined pressure according to a result of detection of the at least one pressure sensor; when result of the judgment of the control unit reaches the predetermined concentration but the predetermined pressure is not reached, the control unit closing the second valve; and when the result of the judgment is that the predetermined concentration is reached and the predetermined pressure is reached, the control unit closing the first valve.

7. The gas concentration control device of pressure vessel as claimed in claim 1, wherein the gas outlet tube further comprises a valve, which is a one-way vale or a check valve to constrain flowing direction of the gas.

8. The gas concentration control device for pressure vessel as claimed in claim 1, wherein the gas concentration detection device further comprises an extension connection tube connected between the connection tube and the gas parameter regulator, the extension connection tube comprising a coil tube for lowering temperature of the gas flowing therein from the connection tube.

9. The gas concentration control device for pressure vessel as claimed in claim 1, wherein the gas parameter regulator comprises a flowrate regulation valve and a third valve, the flowrate regulation valve regulating flowrate and flow velocity of the gas flowing therein, the third valve controlling if the gas to be detected is allowed to flow into the gas concentration detector.

10. The gas concentration control device for pressure vessel as claimed in claim 1, wherein the accommodation space comprises at least one temperature sensor arranged therein to detect temperature inside the accommodation space so as to control the gas parameter regulator.

11. The gas concentration control device for pressure vessel as claimed in claim 1, wherein the pressure vessel has a pressure greater than 2 atm.

12. The gas concentration control device for pressure vessel as claimed in claim 1, wherein the chamber comprises at least one heating module to make the accommodation space reaching a predetermined temperature and a predetermined temperature rising rate.

13. The gas concentration control device for pressure vessel as claimed in claim 1, wherein the accommodation space comprises a fan that is arranged therein and is driven by a motor to rotate so as to cause the gas inside the accommodation space to flow.

* * * * *